United States Patent [19]

Lupoli et al.

[11] Patent Number: 4,695,429

[45] Date of Patent: Sep. 22, 1987

[54] ENGINE EXHAUST PARTICULATE IGNITOR CONSTRUCTION

[75] Inventors: Peter J. Lupoli, Hamden; Donald J. Mattis, Norwalk, both of Conn.

[73] Assignee: Casco Products Corporation, Bridgeport, Conn.

[21] Appl. No.: 714,190

[22] Filed: Mar. 20, 1985

[51] Int. Cl.$^4$ .................. B01D 50/00; F01N 3/10; F01N 3/38; F01N 7/18

[52] U.S. Cl. .................... 422/49; 422/174; 422/178; 422/169; 55/DIG. 10; 55/DIG. 30; 60/303

[58] Field of Search ............... 422/169, 174, 178, 49, 422/199; 55/DIG. 10, DIG. 30, 76; 60/303, 300

[56] References Cited

U.S. PATENT DOCUMENTS

| | | |
|---|---|---|
| 3,958,099 | 5/1976 | Mattis . |
| 3,989,029 | 11/1976 | Friedl et al. .................... 126/110 B |
| 4,007,353 | 2/1977 | Horwitt . |
| 4,322,387 | 3/1982 | Virk et al. .................... 422/174 |
| 4,534,327 | 8/1985 | Latsch et al. .................... 123/273 X |
| 4,544,388 | 10/1985 | Rao et al. .................... 55/283 X |

Primary Examiner—Barry S. Richman
Assistant Examiner—Lynn M. Kummert
Attorney, Agent, or Firm—Mitchell D. Bittman

[57] ABSTRACT

An exhaust gas purification device for installation in the exhaust line of an internal combustion engine of a vehicle, for igniting and vaporizing particulate matter in the exhaust stream. The device includes a canister having a tubular casing with an open end, and an end fitting having a wide mouth which fits against the open end, and thereby closing off the same. The fitting has an inlet port for connection to the exhaust pipe of the engine. Disposed within the casing is a porous filter element which traps small amounts of solid matter such as soot, and keeps it from entering the atmosphere through the vehicle's tailpipe. Igniting devices in the canister adjacent the inlet side of the filter, are located along the exhaust stream flowpath. Upon contact with the igniting devices, at least some of the particulate matter in the stream is vaporized, and passed, as a gas, through the filter. The arrangement prevents clogging of the minute openings of the filter with relatively large particles, which would otherwise block the exhaust flow and cause malfunction of the engine. The device is especially well suited for use in diesel engines, to vaporize carbon (soot) in the exhaust stream.

22 Claims, 11 Drawing Figures

U.S. Patent  Sep. 22, 1987  Sheet 1 of 3  4,695,429
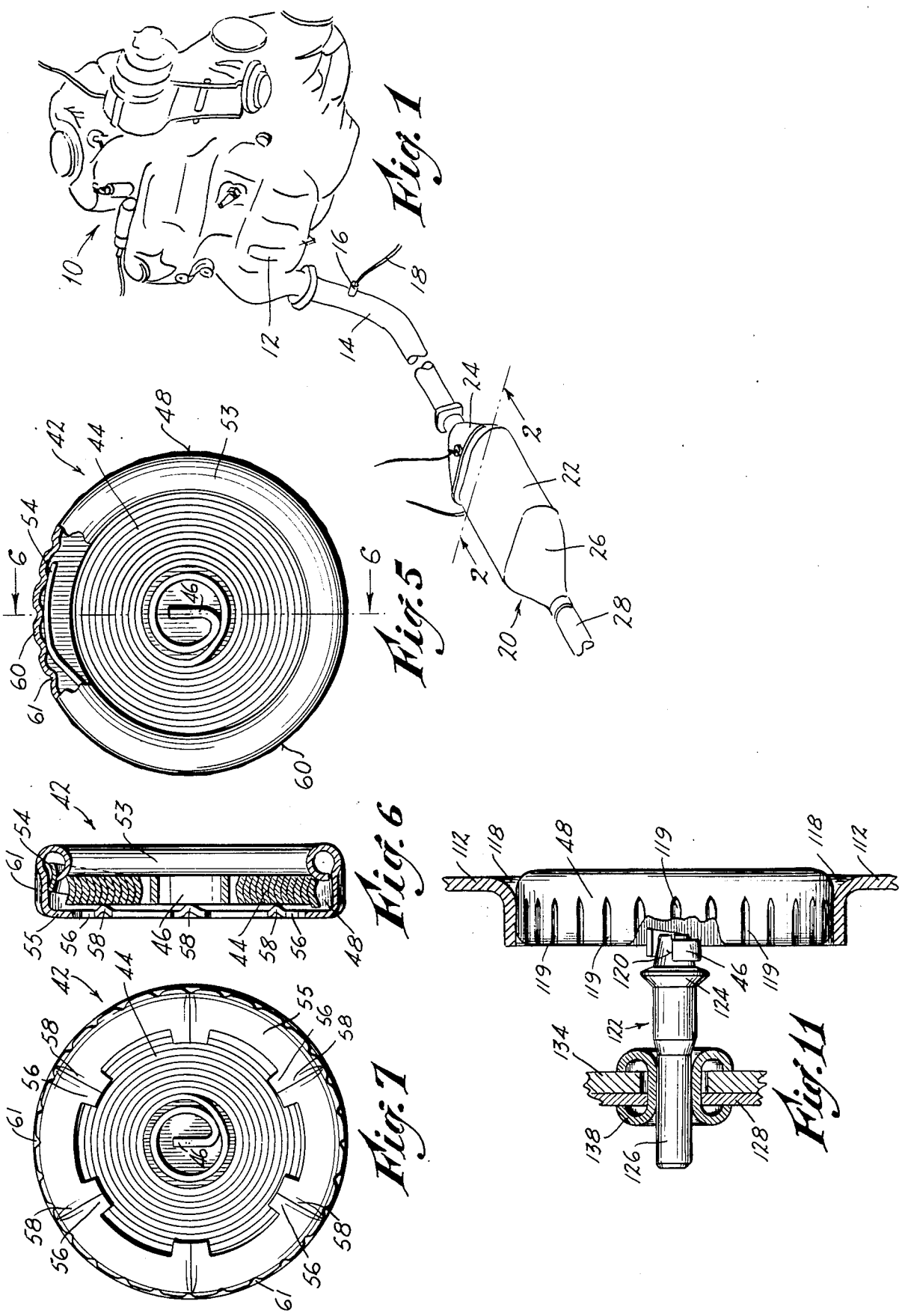

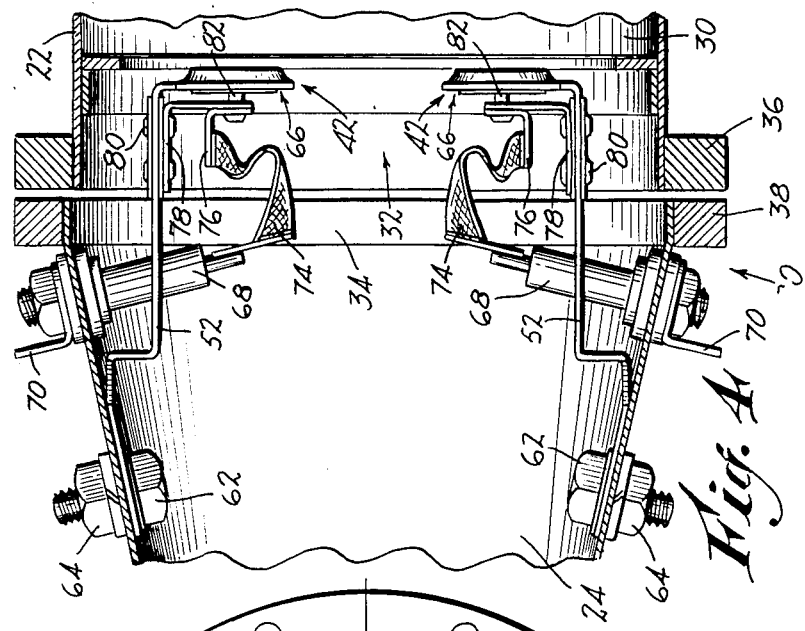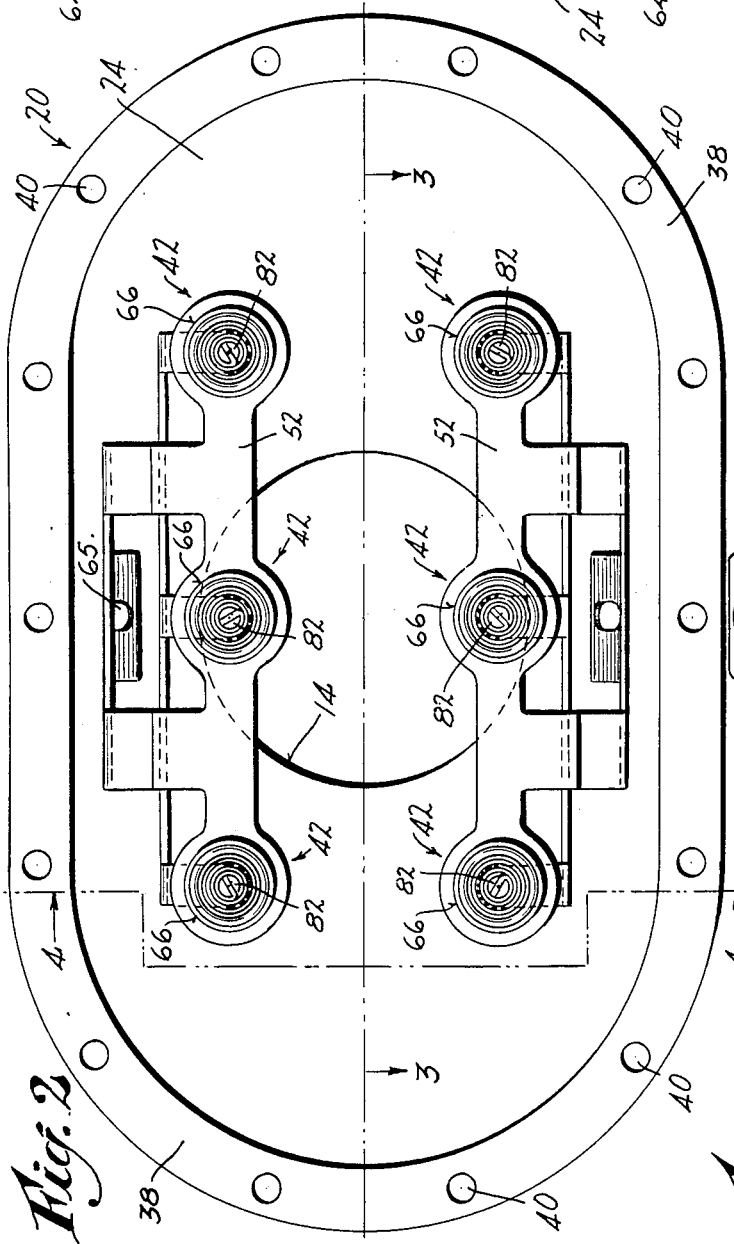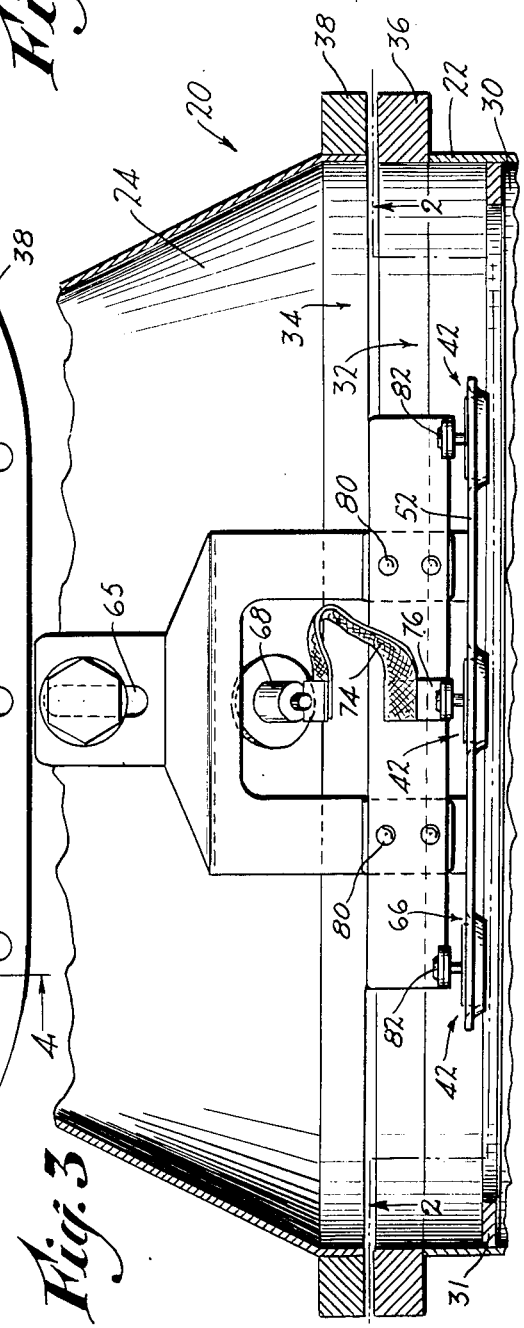

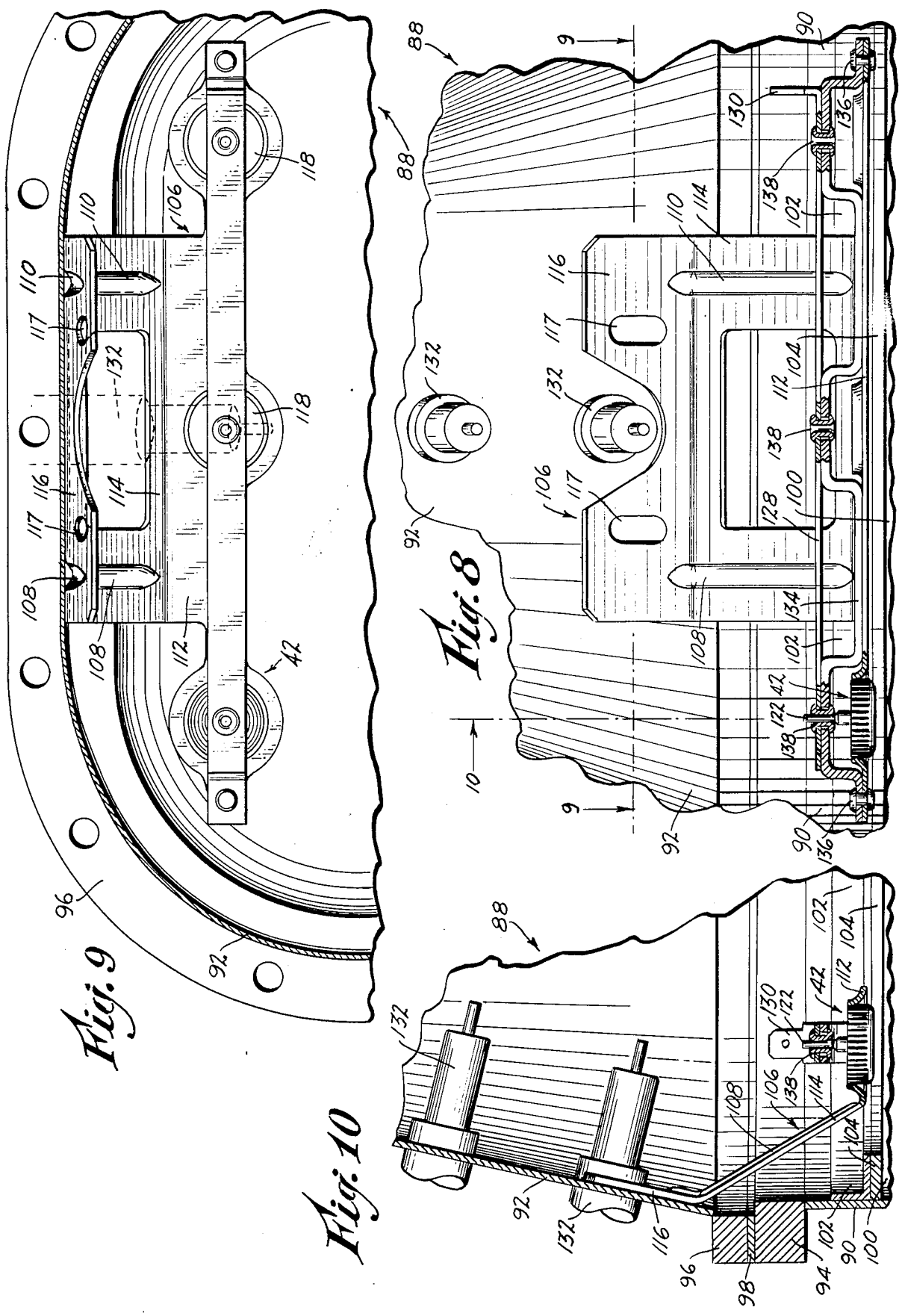

ENGINE EXHAUST PARTICULATE IGNITOR CONSTRUCTION

NO CROSS REFERENCES TO RELATED APPLICATIONS

This invention relates generally to pollution control devices for internal combustion engines, and more particularly to devices of the type which are connected in series with the exhaust line of the engine.

Since the mid 1970s the use of a catalytic converter has become widespread, for reducing the amount and type of exhaust pollutants which are discharged into the atmosphere by gasoline engines. Such converters take the form of in-line canisters that reduce hydrocarbon and carbon monoxide pollutants from the exhaust gas. The converters generally contain pellets coated with catalytic material comprising platium and palladium; the catalytic material promotes burning or oxidization of the pollutants as the exhaust gas passes through the converter on the way to the tailpipe. Unleaded gasoline must be employed, since leaded fuel will contaminate the catalyst, causing permanent damage thereto, and thus will render the converter ineffective.

Such catalytic converters are electrically passive, and rely upon the relatively high temperature of the exhaust gas to initiate the necessary chemical reactions. While the reduction in quantity of exhaust pollutants from gasoline-driven vehicles, as well as the altered nature of such gases, have resulted in considerably cleaner air, little attention has been directed at the control or processing of diesel engine exhaust, which is chemically distinct from exhaust of a gasoline engine but which has its own undesirable characteristics; namely it contains excessive amounts of carbon or soot, which makes its presence known in the form of a foul-smelling, visible, smoky discharge. Although the quantity of certain toxic gases emitted by a diesel engine is inherently less than the quantity from a comparably-sized gasoline engine, the presence of soot in the exhaust is deemed to constitute a health hazard.

One proposal has been to introduce into the exhaust line a filtering device in the nature of a particulate-trap, which would catch solid particles and permanently retain them. The problem with this approach is that the quantity of such particles is so great that the filter element quickly becomes clogged, especially where the openings in the element are small enough to do an adequate filtering job. On the other hand, the use of larger openings would reduce the efficiency of the filter. A suitable compromise has, to our knowledge, not yet been achieved as far as producing a suitable filtering mechanism for particulate matter, which is both effective and useable over an extended period of operation.

SUMMARY

The problems of filtering systems as described above are largely obviated by the present invention which has for an object the provision of a novel and improved exhaust-gas purification system for installation in the exhaust line of an internal combustion engine, which system is especially simple in its structure and provides an effective filtering of particulate matter without causing excessive accumulation of solid material in the opening of the filter, even over extended periods of operation.

A related object of the invention is to provide an improved exhaust-gas purification system as above set forth, wherein particles of solid matter are effectively ignited and either completely vaporized or else converted into minute cinder form prior to the entry into the filter material, thereby enabling the vapors to pass harmlessly through the filter and minimizing overall build-up of solid particles within the filter itself.

Yet another object of the invention is to provide an improved exhaust-gas purification system as above characterized, wherein a series of relatively simple igniting coils disposed adjacent the inlet of the filter is employed in order to provide the desired burning of the particulate matter, the coils being especially rugged and sturdy so as to minimize or eliminate possible problems from damage due to vibration, shock, sudden movement, etc.

Still another object of the invention is to provide an improved exhaust-gas purification system of the kind indicated, wherein a first series of igniting coils is provided with its own energization circuit, and a second, similar series provided with a second energization circuit, such that either the first or the second series or both, can be selectively energized at any particular time, as required, in order to initiate the igniting process. Such initiation could, for example, be the result of a pressure build up which is sensed at the location of the inlet to the filter element, indicating that the latter has become clogged with soot, solids, or other particulate matter.

Yet another object of the invention is to provide an improved exhaust-gas purification system as outlined above, wherein a series of disc-like igniting coils is employed with a porous filter element, and wherein the coils are mounted in such a way that most of the area on both of the opposite sides of the coils is exposed to the exhaust stream and thus capable of contact with particulate matter contained therein, thereby maximizing the overall efficiency of the system.

A still further object of the invention is to provide an improved ignitor construction as above set forth, wherein the various components are capable of fabrication from simple metal parts, such that the manufacturing cost can be maintained as low as possible.

Yet another object of the invention is to provide an improved exhaust-gas purification system as outlined above, wherein igniting devices associated with the system are mounted in such a way that replacement or repair thereof is greatly facilitated, should this become necessary, and can be accomplished without disturbing the filter element, and with only a minimum of servicing time being required.

The above objects are accomplished by a novel exhaust-gas purification canister for installation in the exhaust line of an internal combustion engine of a vehicle, comprising a generally tubular casing having an open end and containing a porous filter element adapted to trap particulate matter carried in the exhaust stream, and a removable end fitting having a wide mouth adapted to be connected to the open end of the casing, and having an inlet port for connection to the said exhaust line. The wide mouth of the fitting is joined to the casing in a manner to close off the same. Disposed within the canister and carried by the fitting is a multiplicity of electrically energized igniting devices, located near the inlet of the filter element and in a path along which the particulate-containing exhaust stream flows. The igniting devices are characterized by a feed-through capability, and can vaporize at least some of the particulate matter in the stream, such that much of the resultant vaporized particulate matter, or minute cinders therefrom, can pass through the porous filter element with minimal clogging of the latter occuring. A bracket mounts the igniting devices on the fitting, so that when the latter is removed from the casing, the igniting devices are retained thereon to facilitate their replacement or repair. Accordingly the filter element can remain in the casing during such replacement or repair, essentially undisturbed. There are also provided electrical connection means for establishing a circuit from the hot side of the electrical system of the vehicle to the igniting devices. Portions of the connection means are accessible from outside the fitting and casing when the two parts are assembled from outside the fitting and casing when the two parts are assembled to one another, thereby to enable selective energization of the igniting devices as the need arises.

Other features and advantages will hereinafter appear.

In the drawings, illustrating several embodiments of the invention:

FIG. 1 is a perspective sketch of an internal combustion engine, showing an exhaust pipe extending therefrom, and showing the improved exhaust-gas purification canister of the present invention connected with the exhaust pipe.

FIG. 2 is an inside plan view of the end fitting portion of the exhaust-gas purification canister of the invention, particularly illustrating a series of six igniting devices carried by the said fitting. This view is taken on the line 2—2 of FIG. 3.

FIG. 3 is a section taken on the line 3—3 of FIG. 2.

FIG. 4 is a section taken on the line 4—4 of FIG. 2.

FIG. 5 is a view, partly in front elevation and partly in section, of an igniting coil and mounting cup therefor, as employed in the canister of the present invention.

FIG. 6 is a section taken on the line 6—6 of FIG. 5.

FIG. 7 is a rear elevation of the igniting coil and mounting cup of FIGS. 5 and 6.

FIG. 8 is a fragmentary view of the interior of a modified canister, showing the casing, end fitting, and igniting devices carried by the latter, this construction constituting another embodiment of the invention.

FIG. 9 is a section taken on line 9—9 of FIG. 8.

FIG. 10 is a section taken on the line 10 of FIG. 8.

FIG. 11 is a view, partly in elevation and partly in section, of an igniting coil and an electrically conductive mounting stud associated therewith, press-fitted into an eyelet that is carried in a mounting strip disposed on a bracket located in the interior of the canister shown in FIGS. 8-10.

Referring first to FIG. 1 there is illustrated an internal combustion engine generally designated by the numeral 10, which can be of usual construction, having an exhaust manifold 12 to which there is connected an exhaust pipe 14. A sensor 16 is connected with the pipe in order to monitor internal pressure therein. The sensor 16 has a pair of electrical leads 18 extending to suitable control and sensing circuitry (not shown).

Referring now to FIGS. 1-4 and in accordance with the present invention there is provided a novel and improved particulateigniting, in-line exhaust-gas purification system for igniting particulate matter in the exhaust-gas stream and vaporizing such matter, or else converting it to a minute cinder form and thus enabling such vaporized matter or cinders to pass through a filter element to be described below. The system comprises a canister 20 having a generally tubular casing 22 and a removable end fitting 24. The casing 22 has a tapered outlet portion 26 which terminates in a coupling that connects with the vehicle's tailpipe 28. At its opposite end or inlet, the casing 22 is closed off by the fitting 24. The casing carries an elongate filter element 30 having the configuration of a flattened cylinder, the element being preferably constituted of a high-temperature porous ceramic-fiber material, and having a series of longitudinal passages (not shown) that are coextensive with one another. The filter element has one set of alternating longitudinal passages open at one end, with the other set of alternating longitudinal passages being blocked at the said one end but open at their other ends, so as to provide expansive side wall areas within the pairs of passages through which exhaust gas vapors can flow in a serpentine fashion and be filtered. The filter openings are sufficiently small to trap relatively large particles which might otherwise pass directly from the exhaust pipe 14 to the tail pipe 28 and out into the atmosphere, but pass particles below a given dimension. The filter element 30 is secured in the casing 22 by a suitable retainer ring 31, as shown in FIG. 3.

As stated above, the open end of the casing 22, indicated 32, is adapted to be removably connected to the wide mouth portion 34 of the fitting 24. The casing 22 has an annular, apertured mounting flange 36, and the open mouth 34 of the fitting 24 has a corresponding annular flange 38 provided with mounting holes 40, FIG. 2. The holes in each flange 36, 38 align when the two parts are assembled, and the flanges are secured with suitable uts and bolts (not shown). A gasket (not shown) is normally interposed between the flanges 36 and 38.

By the present invention there is carried by the fitting 24 a multiplicity of igniting devices 42, three being mounted on one of two identical brackets 52, and three being mounted on the second of said brackets. The brackets 52 are particularly illustrated in FIGS. 2-4. One of the igniting devices 42 is shown in FIGS. 5-7 and comprises a fairly tight-wound spiral igniting coil 44 in the form of an electrical resistance ribbon, preferably constituted of Kanthal (a registered trademark) or other high temperature alloy. As shown, the coil 44 has a generally V-shaped cross-section such that adjacent convolutions interlock with one another, and the coil thus forms a flat, disc-like structure. The inner convolution terminates in a free end 46. The coil is carried in a metal cup or casing 48 having a curled over circumferential edge 53 which firmly mechanically secures and electrically contacts the outermost convolution 54 of the coil. The curling operation is accomplished after the coil 44 is inserted in the cup 48, and the outermost convolution is provided with an offset, in an axial direction as illustrated in FIG. 6, such that the curled over edge 53 can crimp this outer convolution in the manner set forth above.

By the present invention, the bottom of the cup 48 is open, such that most of the coil convolutions are exposed on both of the opposite faces of the coil. The edges of the cup opening are defined by a circumferential flange 55 of the cup, the flange having inwardly-extending projections 56 constituting support tabs or lugs, each of which has a radially extending rib 58 that directly engages the convolutions of the coil 44 and that provides a back-up or support therefor. In FIG. 7, six such lugs 56 are illustrated; however it can be appreciated that other lug configurations could readily be employed.

Also, by the present invention the side wall 60 of the cup 48 has ribs 61 or knurling. This construction is of importance in achieving stiffness of the side wall, in addition to having other advantages which will be explained below.

In the production of the coil 44, it is energized and an oxide coating forms on its surface, sufficient to prevent adjacent convolutions from short-circuiting to each other and to the lugs 56. After installation, subsequent energizations further lugs 56. After installation, subsequent energizations further reinforce the insulation. This effect is well known in the heating coil art, and thus forms no part of the present invention.

Referring again to FIGS. 2–4, it can be seen that each of the brackets 52 has a Z-shaped configuration, and each is secured on the fitting wall by a bolt 62 and nut 64. By the present invention each bracket 52 has an elongate slot 65 through which its bolt 62 extends, so as to permit limited adjusting movement of the brackets 52 in directions parallel to the axis of the fitting 24 and casing 22. Such movement in turn shifts the igniting devices 42 to positions either closer to or farther from the surface of the filter element 30. It has been found to be desirable to retain the capability of adjusting the position of these devices 42 with respect to the inlet of the filter element 30, in order to optimize the amount of the exhaust stream which is exposed to the six igniting devices 42. Also by the present invention wherein both sides of the coils are exposed, a maximum igniting zone or area is realized. This area is roughly double that which would be available were the bottom of the igniting cup 48 not open. If the coil convolutions are spaced, as they may well be, then a feed-through capability of the igniting devices is also had.

Further, in accordance with the present invention, the brackets 52 are provided with mounting apertures 66 for receiving the igniting devices 42, each bracket being shown as having three such apertures 66 in alignment with one another. Igniting devices similar to that designated 42 and shown in FIGS. 5–7 are mounted in the apertures by being press-fitted therein. In accomplishing a firm retention, the apertures 66 are provided with drawn or drifted wall portions adapted to mechanically grip the knurled or ribbed outer wall 60 of the respective igniting cup 48, and to establish electrical connection therewith as well as to physically retain the cup 48.

The cups 48 electrically contact the respective brackets 52, which in turn are bolted to the fitting 24. This fitting is normally at electrical ground potential by virtue of its connection to the exhaust manifold of the engine. Accordingly, the outermost convolution 54 of each igniting coil 44 is also at electrical ground potential.

By the present invention, electrical connection means are provided for establishing a circuit from the hot side of the electrical system of the vehicle to the innermost convolution or end 46 of each igniting coil 44. Two feed-through insulator plugs 68 are shown in FIG. 4, having external terminals 70. The latter are accessible from outside the fitting 24 and casing 22, and are connected to suitable control and switching circuitry (not shown). The provision of the two separate feed-through plugs 68 permits selective energization of the three igniting coils 44 on either bracket 52, one group at a time, or energization of both sets, for a total of six igniting coils 44. The inner terminals are connected by means of pig-tails or stranded wire 74 to brackets 76. The brackets 76 are insulated from the brackets 52, as shown in FIG. 4, by two pairs 78 of insulating spacers, and are mounted by rivets 80. The brackets 76 are connected to studs 82 that have slotted ends (FIG. 2) into which are crimped the innermost convolution 46 of the respective igniting coil 44. By such arrangement, electrical continuity is established between the innermost convolution of each of the three coils 44 mounted on the one bracket 52 and one terminal 70, and between the innermost convolution of each of the remaining three coils 44 mounted on the other bracket 52, and its corresponding terminal 70. Connection of the studs 82 to the respective brackets 76 can be effected by suitable staking or crimping operations, as can be readily understood.

Another embodiment of the invention is illustrated in FIGS. 8–11, showing a modified exhaust-gas purification canister 88 comprising a casing 90 and end fitting 92. The casing 90 has a mounting flange 94, and the fitting 92 has a corresponding flange 96. A gasket 98 is disposed between the flanges when the two parts are assembled, as shown. Suitable fasteners are employed, extending through mounting holes in the flanges, similar to those of the first embodiment. The casing 90 carries a filter element 100 which is held in position by a ring 102 press-fitted into place, and a washer or gasket 104 is disposed between the ring 102 and the end of the filter element 100.

As provided by the invention a novel modified igniting construction is associated with the casing 90 and fitting 92 for igniting particulate matter in the exhaust-gas stream, and for vaporizing the matter, or else converting it to a minute cinder form and thus enabling such vaporized matter or cinders to pass, for the most part, through the filter element 100 and out through the tailpipe 28 into the atmosphere. This modified construction involves a different bracket structure, and also a different mounting arrangement for the igniting cups 48 and igniting coils 44 as compared with that of the previously described device.

In the modified construction illustrated in FIGS. 8–11, a total of six igniting devices 42 is also employed, but for simplicity all but one of the devices has been omitted from the views. Also, only one bracket is illustrated, as opposed to the two which would actually be used.

The modified bracket shown is designated by the numeral 106 and has two stiffening ribs extending along its length, indicated at 108 and 110. These provide rigidity to the bracket portions and minimize any tendency for movement of the part carrying the igniting devices, resulting from vibration, shock, etc. In FIG. 10, the parts of the bracket are indicated 112, 114 and 116 respectively. The apertured support portion 112 of the bracket 106 is joined to the mounting portion 116 by the connector portion 114, the latter having the stiffening and strengthening ribs 108, 110. The mounting part 116 has two mounting holes 117 that receives fasteners (not shown) which in turn extend through the wall of the fitting 92, as in the previous construction. The mounting holes are elongated to permit limited adjusting movement of the bracket 106 in directions parallel to the axis of the casing 90 and fitting 92.

Referring to FIG. 8, by the present invention there is provided a novel arrangement for mechanically mounting the assemblage comprising the igniting cup and coil such that it is highly resistant to damage due to vibration or shock, and at the same time enables simple electrical connections to be made to the coil. Details of the mounting arrangement are shown in Fig. 11. In accomplishing the above object, the bracket portion 112 is provided with a series of mounting apertures 118 having swaged or drifted wall portions which are adapted to receive the conductive cups 48, respectively carrying igniting coils 44 similar to those shown in FIGS. 5-7. By this invention the outer wall of the cup 48 has ribs, or a knurled configuration 119. Only one such cup and coil is shown in these figures, for simplicity. In some of the appended claims, the cup is referred to as a mounting cup for the coil.

The provision of ribs on the outer surface of the conductive cups 48 has a number of important advantages. First, the ribs establish small, high-pressure contact areas with the drifted wall portions of the apertures 118. The high-pressures insure a good electrical (low-resistance) connection between the cup 48 and bracket 106. Second, since the ribs actually minimize the areas of contact between the cup and bracket, the thermal conductivity therebetween is also reduced. Accordingly any heat from the igniting coils 44 which is transferred to the cups 48, is not so readily drawn away by the brackets 106 that hold the cups. During operation, the coils 44 are intended to reach incandescence, and any drawing off of heat from the coils, as to the bracket for example, would reduce the coil temperature and thus impair proper functioning. Finally, the ribs provide a required stiffening to the cups, which has been found to be necessary during the curling of the lip or edge 53 of the cup. It has been found that if the ribs are eliminated, and with a cup that has an opening at its bottom, the side walls of the cup do not exhibit sufficient strength to withstand the curling operation that crimps the outer convolution of the coil. Accordingly, the provision of the ribs is seen to constitute an important feature of the improved igniting device of the present invention.

As seen in FIG. 11, the center convolution 46 of the igniting coil 44 is secured in a slot 120 at the end of a conductive stud 122, and crimped in place. This stud has a shoulder 124 and cylindrical portion 126. The stud is carried on a mounting strip 128 having an upstanding electrical terminal lug 130, FIG. 10, for connection to one of two feed-through insulator plugs 132. The connection is preferably accomplished by a flexible lead such as a pig-tail, as illustrated in the first embodiment, but this connection has been omitted from FIGS. 8-10 in the interest of clarity. Disposed between the mounting strip 128 and the bracket portion 112 is an anodized aluminum intermediary strip or support bar 134, having a hard anodizing coating on the order of 0.001-0.002 inch in thickness, which is sufficient to render the strip non-conductive with respect to adjacent metal conductors that are in contact with its surface. As shown, the intermediary strip 134 is secured to the portion 112 of the bracket by rivets 136 (FIG. 8), and the mounting strip 128 is mechanically secured to the intermediary strip 134 by eyelets 138. The eyelets are preferably constituted of stainless steel, as is the mounting strip 128. This material is well suited to stand up to the heat to which it is exposed, as well as being resistant to the corrosive chemicals that make up the exhaust gases, for the most part.

By the invention, the cylindrical portion 126 of the stud 122 is press-fitted into the opening of the eyelet 138, thereby mechanically securing the eyelet 138 to the stud as well as establishing electrical connection from the stud 122 to the strip 128 only. The intermediary strip 134 remains electrically insulated from the strip 128 by virtue of the anodizing. The voltages employed with the igniting devices of the present invention are nominally 12 volts d. c., which is sufficiently low to avoid problems with breakdown of the anodizing coating on the intermediary strip 134. The upstanding terminal lug 130 will accept either a push-on type spade receptacle, or else another type of more permanent electrical connection to the terminal on one of the feed-through insulator plugs 132.

It will be seen that with the above arrangement, there is provided an especially rugged, unitary assemblage comprising the igniting coils, mounting cups therefor, mounting bracket, intermediary bar 134, terminal strip 128 and studs 122 received therein. The components making up this assemblage are relatively rigid with one another, and therefore the device is resistant to damage due to vibration, mechanical shock, etc. This is considered to be an important feature of the invention.

It will be understood that only one bracket 106, igniting cup 48 and coil are illustrated in FIG. 8, but that a similar series of three coils mounted in a bracket similar to that shown is carried on the diametrically opposite wall of the end fitting 92. Electrical connection to the terminal strip of this other assemblage would be effected through that one of the feed-through plugs 132 that was not connected with the terminal strip 128, as can be readily understood.

In operation, energization of the igniting coils 44 is intended to take place on an intermittent basis. Typically, either set of three coils would be energized for a maximum period of around one minute. A command from a suitable control module (not shown) on the vehicle could be employed for initiating such energization. Monitoring of pressure in the exhaust line of the engine would likely govern the operation.

Typically three coils such as those disclosed above, draw a total of about 20 amperes, at an applied nominal voltage of 13 volts. Under such circumstances, the coils reach incandescence, and are sufficiently hot to ignite particles which come in contact with the coil, from either side thereof. It has been determined that some of the ignited particles in turn reach other particles in the area, and that a kind of chain reaction is created, wherein one hot particle will cause ignition of adjacent particles, thus resulting in rapid vaporization and burning of much of the particulate matter in the canister. Such particles are already in a heated condition, having just been discharged from the engine.

From the above it can be seen that we have provided a novel and improved exhaust-gas purification system which is especially simple in its structure, and yet reliable and rugged even over extended periods of use. The mounting arrangements devised for the igniting coils insure freedom from malfunction due to vibration or mechanical shock. The open coil construction provides high oxidizing efficiency by virtue of the fact that each igniting coil has both of its opposite faces completely exposed to the exhaust stream. Furthermore, the axes of the coils are generally parallel to the exhaust-gas flow, whereby some particles will tend to impinge directly on one face of the coil, with other particles striking the opposite face, as a result of turbulent flow around the area of the coil.

Servicing or replacement of one or more of the igniting devices is greatly facilitated by the fact that the brackets which mount them are carried on the end fitting, and not the casing. The electrical feed-through insulator plugs are also mounted on the end fitting, and accordingly the latter can be readily removed, including the igniting system components, essentially without disturbing the filter element at all. Were an igniting coil to fail, replacement of the entire assemblage comprising the mounting bracket and its three igniting devices would probably constitute the simplest procedure.

External control of the energization of either three or six igniting devices is made possible through the use of two feed-through insulator plugs, one plug feeding a first set of three igniting assemblages, and the second plug feeding an additional set of three. Operation on a selective basis is thus possible, and control can be made to respond to changes in an engine parameter such as speed, or exhaust manifold pressure, etc., as desired.

The disclosed arrangements are thus seen to represent a distinct advance and improvement in the field of exhaust-gas purifiers.

Each and every one of the appended claims defines an aspect of the invention which is separate and distinct from all others, and accordingly each claim is to be treated in this manner when examined in the light of the prior art devices in any determination of novelty or validity.

Variations and modifications are possible without departing from the spirit of the claims.

What is claimed is:

1. A vibration-resistant exhaust-gas purification canister for installation in an exhaust line of an internal combustion engine in a vehicle, comprising in combination:
   (a) a generally tubular exhaust-gas casing having an open end and containing a porous filter element for trapping particulate matter carried in an exhaust stream,
   (b) an end fitting having a wide mouth removably connected to the open end of the exhaust-gas casing, and having an inlet port for connection to an exhaust line,
   (c) releasable fastening means joining the wide mouth of the fitting to the open end of the exhaust-gas casing, so as to close off said open end,
   (d) a multiplicity of compact vibration-resistant spiral-wound open-face igniting coils having enclosing casings, disposed between the porous filter element in the exhaust-gas casing and the inlet port of the fitting, said coils being located in a path along which the particulate-containing exhaust stream flows, for vaporizing at least some of the particulate matter in the stream whereby the resultant vaporized particulate matter can pass through the porous filter element with minimal clogging of said filter element,
   (e) a bracket mounting the enclosing casings of the igniting coils respectively on the end fitting whereby when the fitting is removed from the exhaust-gas casing, the igniting coils are retained by the fitting to facilitate their replacement or repair, and
   (f) electrical connection means for establishing a circuit from a hot side of an electrical system of a vehicle to the igniting coils, said connection means being accessible from outside the end fitting and exhaust-gas casing when they are assembled to one another,
   (g) said electrical connection means comprising an insulated feed-through plug mounted in the wall of the fitting, and connected with the igniting coils.

2. A vibration-resistant exhaust-gas purification canister for installation in an exhaust line of an internal combustion engine in a vehicle, comprising in combination:
   (a) a generally tubular exhaust-gas casing having an open end and containing a porous filter element for trapping particulate matter carried in an exhaust stream,
   (b) an end fitting having a wide mouth removably connected to the open end of the exhaust-gas casing, and having an inlet port for connection to an exhaust line,
   (c) releasable fastening means joining the wide mouth of the fitting to the open end of the exhaust-gas casing, so as to close off said open end,
   (d) a multiplicity of compact igniting devices disposed between the porous filter element in the exhaust-gas casing and the inlet port of the fitting, said devices being located in a path along which the particulate-containing exhaust stream flows, for vaporizing at least some of the particulate matter in the stream whereby the resultant vaporized particulate matter can pass through the porous filter element with minimal clogging of said filter element,
   (e) a bracket mounting the igniting devices on the end fitting whereby when the fitting is removed from the exhaust-gas casing, the igniting devices are retained by the fitting to facilitate their replacement or repair, and
   (f) electrical connection means for establishing a circuit from a hot side of an electrical system of a vehicle to the igniting devices, said connection means being accessible from outside the end fitting and exhaust-gas casing when they are assembled to one another,
   (g) said electrical connection means comprising a pair of insulated feed-through plugs mounted in the wall of the fitting,
   (h) said igniting devices comprising two sets of tightly-wound spiral igniting coils, said bracket mounting the outer convolutions of the coils, respectively,
   (i) one set of coils being connected with one of said plugs, and the other set of coils being connected with the other of said plugs, whereby either set can be selectively energized from outside of the canister.

3. A vibration-resistant exhaust-gas purification canister for installation in an exhaust line of an internal combustion engine in a vehicle, comprising in combination:
   (a) a generally tubular exhaust-gas casing having an open end and containing a porous filter element for trapping particulate matter carried in an exhaust stream,
   (b) an end fitting having a wide mouth removably connected to the open end of the exhaust-gas casing, and having an inlet port for connection to an exhaust line,
   (c) releasable fastening means joining the wide mouth of the fitting to the open end of the exhaust-gas casing, so as to close off said open end,
   (d) a multiplicity of compact spiral igniting devices disposed between the porous filter element in the exhaust-gas casing and the inlet port of the fitting, said devices being located in a path along which the particulate-containing exhaust stream flows, for vaporizing at least some of the particulate matter in the stream whereby the resultant vaporized particulate matter can pass through the porous filter element with minimal clogging of said filter element, (e) bracket means for adjustably mounting the igniting devices on the end fitting whereby the devices can be adjusted to a position either close to or remote from the said filter element, (f) electrical connection means for establishing a circuit from a hot side of an electrical system of a vehicle to the igniting devices, said connection means being accessible from outside the end fitting and exhaust-gas casing when they are assembled to one another, (g) said electrical connection means comprising an insulated feed-through plug mounted in the wall of the fitting, and (h) a pig-tail having one end connected to the inner end of the plug and having its other end electrically connected to the igniting devices, thereby enabling relative movement to occur between the igniting devices and the feed-through plug on the end fitting when said bracket means is adjusted.

4. A vibration-resistant exhaust-gas purification canister for installation in an exhaust line of an internal combustion engine in a vehicle, comprising in combination:
(a) a generally tubular exhaust-gas casing having an open end and containing a porous filter element for trapping particulate matter carried in an exhaust stream,
(b) an end fitting having a wide mouth removably connected to the open end of the exhaust-gas casing, and having an inlet port for connection to an exhaust line,
(c) releasable fastening means joining the wide mouth of the fitting to the open end of the exhaust-gas casing, so as to close off said open end,
(d) a multiplicity of compact spiral igniting devices disposed between the porous filter element in the exhaust-gas casing and the inlet port of the fitting, said devices being located in a path along which the particulate-containing exhaust stream flows, for vaporizing at least some of the particulate matter in the stream whereby the resultant vaporized particulate matter can pass through the porous filter element with minimal clogging of said filter element,
(e) a bracket mounting the igniting devices on the end fitting whereby when the fitting is removed from the exhaust-gas casing, the igniting devices are retained by the fitting to facilitate their replacement or repair,
(f) electrical connection means for establishing a circuit from a hot side of an electrical system of a vehicle to the igniting devices, said connection means being accessible from outside the end fitting and exhaust-gas casing when they are assembled to one another,
(g) said bracket having:
(i) a mounting portion engageable with the fitting,
(ii) a support portion in which the igniting devices are carried, and
(iii) a connector portion joining said mounting and support portions,
(iv) said connector portion having a series of elongate ribs to stiffen the connector portion and minimize relative movement between the igniting devices and the fitting and exhaust-gas casing.

5. A vibration-resistant exhaust-gas purification canister for installation in an exhaust line of an internal combustion engine in a vehicle, comprising in combination:
(a) a generally tubular exhaust-gas casing having an open end and containing a porous filter element for trapping particulate matter carried in an exhaust stream,
(b) an end fitting having a wide mouth removably connected to the open end of the exhaust-gas casing, and having an inlet port for connection to an exhaust line,
(c) releasable fastening means joining the wide mouth of the fitting to the open end of the exhaust-gas casing, so as to close off said open end,
(d) a multiplicity of compact vibration-resistant, spiral, tightly wound igniting coils with touching convolutions, disposed between the porous filter element in the exhaust-gas casing and the inlet port of the fitting, said coils being located in a path along which the particulate-containing exhaust stream flows, for vaporizing at least some of the particulate matter in the stream whereby the resultant vaporized particulate matter can pass through the porous filter element with minimal clogging of said filter element,
(e) means mounting the igniting coils on the end fitting with both of the opposite faces of the coils being exposed to the exhaust stream so as to increase the efficiency of the vaporizing that occurs, said coils being removable with the end fitting as a unit when the end fitting is removed from the exhaust-gas casing, thereby to facilitate their replacement or repair, and
(f) electrical connection means for establishing a circuit from a hot side of an electrical system of a vehicle to the igniting coils, said connection means being accessible from outside the end fitting and exhaust-gas casing when they are assembled to one another.

6. A vibration-resistant exhaust-gas purification canister for installation in an exhaust line of an internal combustion engine in a vehicle, comprising in combination:
(a) a generally tubular exhaust-gas casing having an open end and containing a porous filter element for trapping particulate matter carried in an exhaust stream,
(b) an end fitting having a wide mouth removably connected to the open end of the exhaust-gas casing, and having an inlet port for connection to an exhaust line,
(c) releasable fastening means joining the wide mouth of the fitting to the open end of the exhaust-gas casing, so as to enable the fitting to be releasably installed on the exhaust-gas casing and removed therefrom, as required during servicing, said fitting normally closing off said open end of the exhaust-gas casing,
(d) a multiplicity of compact spiral igniting coils disposed between the porous filter element in the exhaust-gas casing and the inlet port of the fitting, said igniting coils being located in a path along which the particulate-containing exhaust stream flows, for vaporizing at least some of the particulate matter in the stream whereby the resultant vaporized particulate matter can pass through the porous filter element with minimal clogging of said filter element,
(e) a plurality of electrically-conductive annular enclosing casings mounting the outer convolutions of the igniting coils,
(f) electrical connection means for establishing a circuit from a hot side of an electrical system of a vehicle to the igniting coils, said connection means being accessible from outside the end fitting and exhaust-gas casing when they are assembled to one another, and
(g) bracket means connected to said end fitting and having a plurality of circular apertures,
(h) said conductive enclosing casings being press-fitted in said apertures respectively whereby the bracket means provides a vibration-resistant mechanical support thereto in said end fitting.

7. A vibration-resistant exhaust-gas purification canister for installation in an exhaust line of an internal combustion engine in a vehicle, comprising in combination:
(a) a generally tubular exhaust-gas casing having an open end and containing a porous filter element for trapping particulate matter carried in an exhaust stream,
(b) an end fitting having a wide mouth removably connected to the open end of the exhaust-gas casing, and having an inlet port for connection to an exhaust line,
(c) releasable fastening means joining the wide mouth of the fitting to the open end of the exhaust-gas casing, so as to enable the fitting to be releasably installed on the exhaust-gas casing and removed therefrom, as required during servicing, said fitting normally closing off said open end of the exhaust-gas casing,
(d) a multiplicity of compact spiral igniting coils disposed between the porous filter element in the exhaust-gas casing and the inlet port of the fitting, said igniting coils being located in a path along which the particulate-containing exhaust stream flows, for vaporizing at least some of the particulate matter in the stream whereby the resultant vaporized particulate matter can pass through the porous filter element with minimal clogging of said filter element,
(e) a plurality of electrically-conductive enclosing casings mounting the igniting coils,
(f) electrical connection means for establishing a circuit from a hot side of an electrical system of a vehicle to the igniting coils, said connection means being accessible from outside the end fitting and exhaust-gas casing when they are assembled to one another, and
(g) bracket means mounting the conductive enclosing casings in the end fitting,
(h) said enclosing casings being annular and having inwardly curled lips mechanically securing and electrically contacting the outer convolutions of said igniting coils, respectively,
(i) said enclosing casings having open bottoms whereby both sides of the respective igniting coils are continuously exposed to the exhaust stream,
(j) the annular walls of the enclosing casings having axially extending ribs to provide stiffening thereto, so as to prevent the walls from buckling when the lip of each enclosing casing is curled over the outer convolution of its igniting coil, during manufacture.

8. A vibration-resistant exhaust-gas purification canister for installation in an exhaust line of an internal combustion engine in a vehicle, comprising in combination:
(a) a generally tubular exhaust-gas casing having an open end and containing a porous filter element for trapping particulate matter carried in an exhaust stream,
(b) an end fitting having a wide mouth removably connected to the open end of the exhaust-gas casing, and having an inlet port for connection to an exhaust line,
(c) releasable fastening means joining the wide mouth of the fitting to the open end of the exhaust-gas casing, so as to enable the fitting to be releasably installed on the exhaust-gas casing and removed therefrom, as required during servicing, said fitting normally closing off said open end of the exhaust-gas casing,
(d) a compact unitary vibration-resistant spirally-wound open igniting coil disposed between the porous filter element in the exhaust-gas casing and the inlet port of the fitting, said coil being located in a path along which the particulate-containing exhaust stream flows, for vaporizing at least some of the particulate matter in the stream whereby the resultant vaporized particulate matter can pass through the porous filter element with minimal clogging of said filter element,
(e) means mounting the unitary igniting coil solely on the end fitting whereby when the fitting is removed from the exhaust-gas casing, the igniting coil is retained by the fitting to facilitate its replacement or repair, and
(f) electrical connection means for establishing a circuit from a hot side of an electrical system of a vehicle to the igniting coil, said connection means being accessible from outside the end fitting and exhaust-gas casing when they are assembled to one another,
(g) a conductive enclosing metal casing engaging the outer convolution of the igniting coil and thereby closely supporting and closely confining the same,
(h) first bracket means mounting said conductive enclosing metal casing on the end fitting, and
(i) additional bracket means, electrically insulated from the first bracket means and mechanically secured thereto, said additional bracket means having a stud mechanically secured to the inner end of the said igniting coil and mechanically supporting the same in fixed position with respect to its outer convolution and the conductive enclosing metal casing.

9. A vibration-resistant exhaust-gas purification canister for installation in an exhaust line of an internal combustion engine in a vehicle, comprising in combination:
(a) a generally tubular exhaust-gas causing having an open end,
(b) an end fitting having a wide mouth removably connected to the open end of the exhaust-gas casing, and having an inlet port for connection to an exhaust line,
(c) releasable fastening means joining the wide mouth of the fitting to the open end of the exhaust-gas casing, so as to close off said open end,
(d) a porous filter element in the path of the exhaust gas, said filter element trapping particulate matter carried in the exhaust gas, (e) a vibration-resistant, spiral, tightly wound igniting coil disposed between the porous filter element in the exhaust-gas casing and the inlet port of the fitting, said coil being located in a path along which the particulate-containing exhaust stream flows, for vaporizing at least some of the particulate matter in the stream whereby the resultant vaporized particulate matter can pass through the porous filter element with minimal clogging of said filter element, (f) means comprising an enclosing electrically-conducting annular casing, mounting the igniting coil on the end fitting with a face of the coil being exposed to the said exhaust stream so as to increase the efficiency of the vaporizing that occurs, said enclosing casing being connected to an outer convolution of the coil and constituting a terminal thereof, and (g) electrical connection means for establishing a circuit from an electrical system of a vehicle to the inner convolution of the igniting coil.

10. A vibration-resistant exhaust-gas purification canister for installation in an exhaust line of an internal combustion engine in a vehicle, comprising in combination:

(a) a generally tubular exhaust-gas casing having an open end and containing a porous filter element for trapping particulate matter carried in an exhaust stream, (b) an end fitting having a wide mouth removably connected to the open end of the exhaust-gas casing, and having an inlet port for connection to an exhaust line, (c) releasable fastening means joining the wide mouth of the fitting to the open end of the exhaust-gas casing, so as to close off said open end, (d) a multiplicity of igniting devices disposed between the porous filter element in the exhaust-gas casing and the inlet port of the fitting, said devices being located in a path along which the particulate-containing exhaust stream flows, for vaporizing at least some of the particulate matter in the stream whereby the resultant vaporized particulate matter can pass through the porous filter element with minimal clogging of said filter element, (e) a bracket mounting the igniting devices on the end fitting whereby when the fitting is removed from the exhaust-gas casing, the igniting devices are retained by the fitting to facilitate their replacement or repair, and (f) electrical connection means including a flexible lead, for establishing a circuit from a hot side of an electrical system of a vehicle to the igniting devices, said connection means being accessible from outside the end fitting and exhaust-gas casing when they are assembled to one another, (g) said bracket including means for slidably adjusting the position of the igniting devices with respect to the exhaust-gas casing and to the filter element carried therein as permitted by said flexible lead, whereby the devices can be adjusted to a position either close to or remote from the filter element.

11. The invention as set forth in claim 10, wherein:

(a) said adjusting means comprises means defining a slot in the bracket, and (b) a fastener carried by the end fitting, and passing through said slot.

12. A vibration-resistant exhaust-gas purification canister for installation in an exhaust line of an internal combustion engine in a vehicle, comprising in combination:

(a) a generally tubular exhaust-gas casing having an open end and containing a porous filter element for trapping particulate matter carried in an exhaust stream, (b) an end fitting having a wide mouth removably connected to the open end of the exhaust-gas casing and forming therewith an enclosure, and having an inlet port for connection to an exhaust line, (c) releasable fastening means joining the wide mouth of the fitting to the open end of the exhaust-gas casing, so as to close off said open end, (d) a multiplicity of compact vibration-resistant, spiral, open-face igniting coils disposed between the porous filter element in the exhaust-gas casing and the inlet port of the fitting, said coils being located in a path along which the particulate-containing exhaust stream flows, for vaporizing at least some of the particulate matter in the stream whereby the resultant vaporized particulate matter can pass through the porous filter element with minimal clogging of said filter element, (e) a bracket mounting the igniting coils on the end fitting whereby when the fitting is removed from the exhaust-gas casing, the igniting coils are retained by the fitting to facilitate their replacement or repair, (f) electrical connection means for establishing a circuit from a hot side of an electrical system of a vehicle to the igniting coils, said connection means being accessible from outside the end fitting and exhaust-gas casing when they are assembled to one another, (g) said igniting coils comprising tightly wound convolutions, each coil having a generally disc-like configuration and the coils having their axes disposed generally in alignment with the flow of the particulate-containing exhaust stream, and (h) an electrically conductive mounting cup for each coil, said cups being annular and surrounding the outermost convolution of each coil, and each cup being electrically connected to its respective outer convolution and constituting a terminal for the coil.

(i) said bracket having a series of spaced apertures, and said cups being press fitted into said apertures, respectively, to provide mechanical support for the igniting coils within said enclosure formed by the exhaust-gas casing and fitting.

13. The invention as set forth in claim 12, wherein:

(a) said mounting cups have ribs on their outer surfaces, (b) said ribs being generally parallel to one another and to the axis of the respective igniting coil, (c) the ribs of each mounting cup tightly engaging the walls of the respective aperture, whereby a low-resistance electrical connection is established between the mounting cups and the bracket.

14. The invention as set forth in claim 12, wherein:

(a) said mounting cups each have a circumferential edge which is curled back upon itself and over a portion of the outer convolution of the respective coil, so as to mechanically hold captive said portion, and at the same time establish a low-resistance electrical connection therewith.

15. The invention as set forth in claim 12, wherein:
(a) said electrical connection means comprises a plurality of slotted studs, said studs being disposed at the respective centers of the coils, and the innermost convolutions of the coils being received in the respective slotted studs, and
(b) a metal strip having apertures in which the slotted studs are received, said metal strip mechanically securing said slotted studs and said coils in position, and establishing electrical connection therewith.

16. The invention as set forth in claim 1 wherein:
(a) said bracket has means for adjustably mounting the igniting devices on the end fitting so as to enable the devices to be shifted with respect to the porous filter element.

17. A vibration-resistant exhaust gas purification canister for installation in an exhaust line of an internal combustion engine in a vehicle, comprising in combination:
(a) a generally tubular exhaust-gas casing having an open end and containing a porous filter element for trapping particulate matter carried in an exhaust stream,
(b) an end fitting having a wide mouth removably connected to the open end of the exhaust-gas casing, and having an inlet port for connection to an exhaust line,
(c) releasable fastening means joining the wide mouth of the fitting to the open end of the exhaust-gas casing, so as to enable the fitting to be releasably installed on the exhaust-gas casing and removed therefrom, as required during servicing, said fitting normally closing off the open end of the exhaust-gas casing,
(d) a multiplicity of unitary compact vibration-resistant open-coil igniting devices disposed between the porous filter element in the exhaust-gas casing and the inlet port of the fitting, said devices being located in a path along which the particulate-containing exhaust stream flows, for vaporizing at least some of the particulate matter in the stream whereby the resultant vaporized particulate matter can pass through the porous filter element with minimal clogging of the filter element,
(e) means mounting the unitary igniting devices solely on the end fitting whereby when the fitting is removed from the exhaust-gas casing, the igniting devices are retained by the fitting to facilitate their replacement or repair, and
(f) electrical connection means for establishing a circuit from a hot side of an electrical system of a vehicle to the igniting devices, said connection means being accessible from outside the end fitting and exhaust-gas casing when assembled to one another,
(g) each of said compact igniting devices comprising an exposed spirally-wound electrical heating wire, and an electrically conductive annular enclosing metal casing constituting a terminal for the wire, supporting and closely confining said wire therein.

18. The invention as set forth in claim 1, wherein:
(a) said mounting means forms a part of an electrical circuit from the igniting devices through the walls of the end fitting and to a cold side of a vehicle's electrical system.

19. The invention as set forth in claim 17, wherein:
(a) said igniting devices comprise wound coils, each coil having a generally disc-like configuration and the coils having their axes disposed generally in alignment with the flow path of the particulate-containing exhaust stream.

20. The invention as set forth in claim 17, wherein:
(a) said enclosing metal casings are mounted in the end fitting.

21. The invention as set forth in claim 17, wherein:
(a) said end fitting permanently carries an electrically insulated terminal accessible from the exterior of the end fitting, said insulated terminal being connected with said igniting devices.

22. The invention as set forth in claim 17, wherein:
(a) said mounting means adjustably secures the igniting devices on the end fitting so as to enable the devices to be shifted with respect to the porous filter element.

* * * * *